United States Patent

Pedronno et al.

[11] Patent Number: 5,971,488
[45] Date of Patent: Oct. 26, 1999

[54] MOTOR VEHICLE SEAT INCLUDING A SEATBELT PRETENSIONER

[75] Inventors: Philippe Pedronno, Marcoussis; Claude Chevallier, Itteville; Hocine Arab, Saint Jean de Thouars, all of France

[73] Assignee: Bertrand Faure Equipements S.A., Boulogne, France

[21] Appl. No.: 09/010,225

[22] Filed: Jan. 21, 1998

[30] Foreign Application Priority Data

Jan. 23, 1997 [FR] France ................................. 97 00673

[51] Int. Cl.⁶ .................................................. A47C 31/00
[52] U.S. Cl. ........................... 297/468; 297/480; 280/806
[58] Field of Search ..................... 297/468, 474, 297/479, 480; 280/806

[56] References Cited

U.S. PATENT DOCUMENTS

| 4,932,722 | 6/1990 | Motozawa | 297/480 |
| 5,152,552 | 10/1992 | Ikegaya | 280/806 |
| 5,308,148 | 5/1994 | Peterson et al. | 297/468 |
| 5,492,368 | 2/1996 | Pywell et al. | |

FOREIGN PATENT DOCUMENTS

| 0 154 883 | 9/1985 | European Pat. Off. | |
| 1258697 | 3/1961 | France | 297/480 |
| 2 706 544 | 12/1994 | France. | |
| 2 716 423 | 8/1995 | France. | |
| 36 31 881 | 4/1988 | Germany. | |
| U-93 03231 | 5/1993 | Germany. | |

OTHER PUBLICATIONS

French Search Report dated Oct. 16, 1997, French Patent Appl No. 97 00673.
Patent abstract of Japan, vol. 007, No. 183, (M–235), Aug. 12, 1983.
Patent abstract of Japan, vol. 007, No. 169, (M–231), Jul. 26, 1983.
Patent abstract of Japan, vol. 007, No. 102, (M–211), Apr. 30, 1983.
Patent abstract of Japan, vol. 010, No. 342, (M–536), Nov. 19, 1986.
Patent abstract of Japan, vol. 014, No. 010, (M–917), Jan. 10, 1989.
Patent abstract of Japan, vol. 007, No. 223, (M–247), Oct. 4, 1983.

*Primary Examiner*—Laurie K. Cranmer
*Attorney, Agent, or Firm*—Marshall, O'Toole, Gerstein, Murray & Borun

[57] ABSTRACT

A motor vehicle seat has a seat proper mounted on two longitudinal slideways via two sideplates. A seatbelt catch is fixed to a cable, itself connected to a pretensioner fixed along one of the sideplates. The sideplate has a passage through which the rear portion of the pretensioner passes, allowing the front portion of the pretensioner to be situated on the inside of said sideplate.

7 Claims, 3 Drawing Sheets

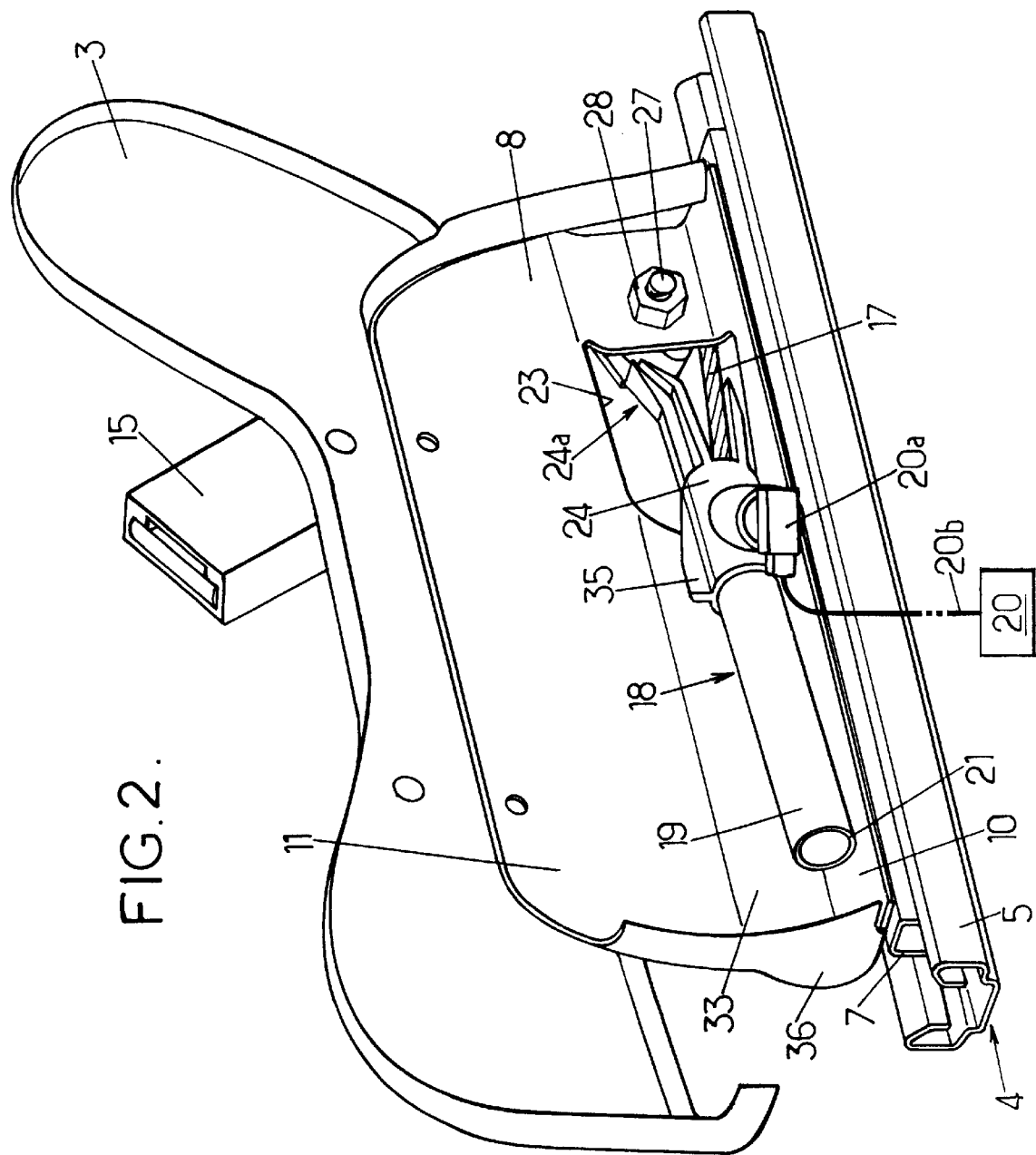

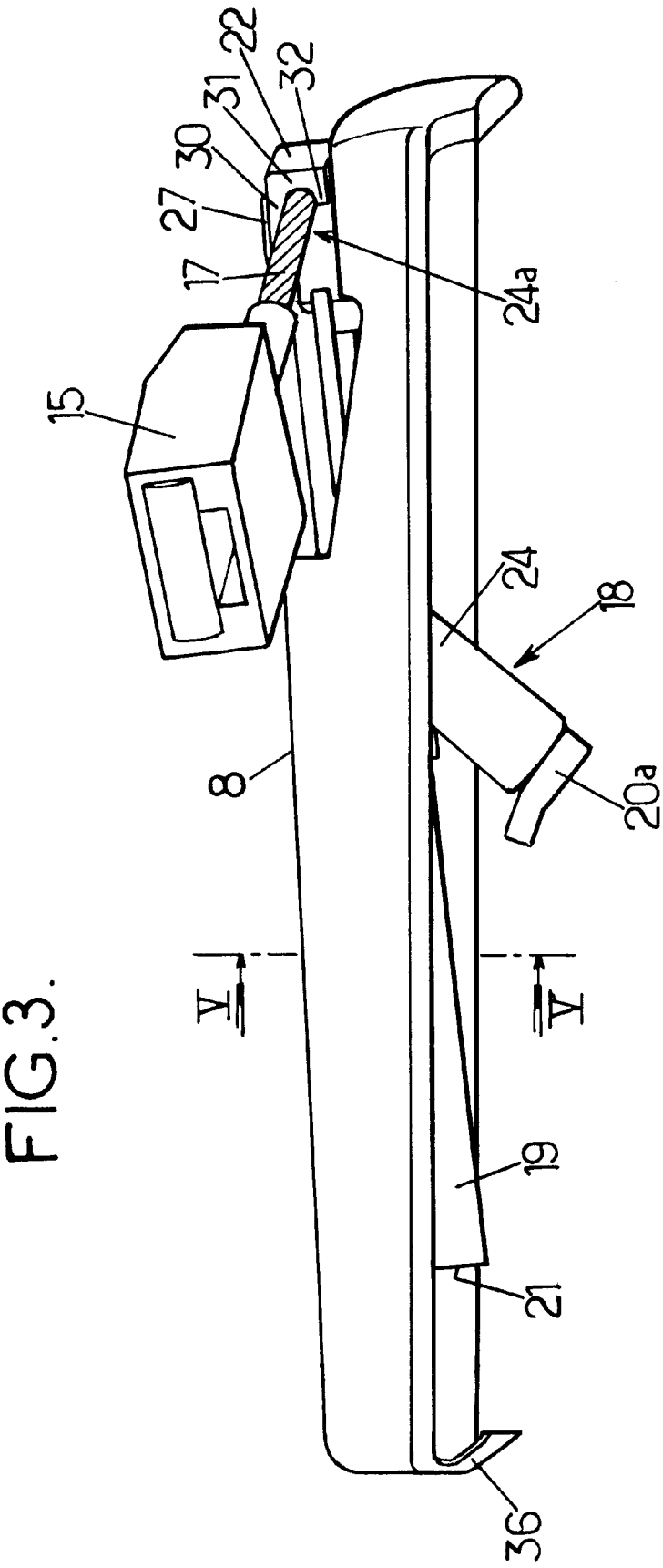

MOTOR VEHICLE SEAT INCLUDING A SEATBELT PRETENSIONER

FIELD OF THE INVENTION

The present invention relates to a motor vehicle eat including a seatbelt pretensioner.

More particularly, the invention relates to such a seat which comprises:

a seat proper;

first and second rigid sideplates each extending horizontally in a "longitudinal" direction and vertically between a bottom portion mechanically connected to the floor of the vehicle and a top portion mechanically connected to the seat proper, each of the two sideplates having an inside facing the other of the two sideplates and an opposite outside;

a seatbelt catch fixed to a cable itself connected to a pretensioner adapted to exert traction on the cable when the vehicle is subjected to a violent impact, the pretensioner being fixed to the first sideplate and extending substantially in the longitudinal direction between a front end and a rear end provided with a guide through which the cable passes.

BACKGROUND OF THE INVENTION

A motor vehicle seat of that type is disclosed in document FR-A-2 716 423, for example.

Nevertheless, seats of that type suffer from the following drawbacks:

the pretensioner and its support project out sideways from the seat, thereby increasing the space occupied by the seat; and it is necessary to hide the pretensioner and its support by means of a cover, generally of plastics material, thereby increasing the cost of the seat.

The present invention seeks in particular to mitigate those drawbacks.

OBJECTS AND SUMMARY OF THE INVENTION

To this end, according to the invention, in a vehicle seat of the kind in question, the pretensioner passes through an opening formed in the first sideplate, the rear end of the pretensioner projecting from the outside of the first sideplate while the major portion of the pretensioner is situated on the inside of said sideplate.

Because of these dispositions, the pretensioner and its support do not significantly increase the space occupied sideways by the seat, and there is no need to provide an additional cover made of plastics material.

Also, the safety of passengers in the vehicle is optimized concerning operation of the pretensioner, since the first sideplate which masks the pretensioner is both rigid and non-removable.

In preferred embodiments, use may also be made of one or more of the following dispositions:

the pretensioner is connected to an electrical connector, itself designed to be connected to an impact sensor via a wire connection, said connector being situated on the inside of the first sideplate, thereby avoiding the need to provide a passage for the electric wire through the first sideplate as is required in the prior art, and the connector of the pretensioner is likewise made very difficult to access, thereby making involuntary disconnection practically impossible;

the guide through which the cable passes has a rigid central core which is partially surrounded by the cable and which is rigidly fixed on the outside of the first sideplate;

the central core of the guide is secured to the remainder of the pretensioner;

the central core of the guide is fixed to the first sideplate by a single screw-and-nut assembly passing through said central core, the pretensioner having abutment zones situated on the inside of the first sideplate and adapted to co-operate with the first sideplate to prevent any rotation of the pretensioner about the screw-and-nut assembly;

the cable is held captive in the guide of the pretensioner between the first sideplate and a side cheek which is secured to the central core of the guide, said cheek being extended at the rear end of the support by a rim which extends substantially as far as the first sideplate and which keeps the cable close to the central core;

said rim has a top portion which is extended forwards by a tab, the cable thus being retained between said tab and said cheek, with this taking place even before the support is mounted on the first sideplate;

the first sideplate has a horizontal bottom rim which projects from the inside of the first sideplate and which is mechanically connected to the floor of the vehicle, said rim being extended by a curved side wall which covers the pretensioner and its support, at least in part, and the curved side wall is itself extended by the top portion of the sideplate which is mechanically connected to the seat proper; and the curved side wall is extended forwards by a rim which projects substantially at right angles from the inside of the first sideplate, forwardly masking the front end of the pretensioner, at least in part.

Other characteristics and advantages of the invention appear from the following detailed description of an embodiment thereof given by way of non-limiting example and with reference to the accompanying drawings.

BRIEF DESCRIPTION OF THE DRAWINGS

In drawings:

FIG. 2 is a perspective view of a portion of the FIG. 1 seat including the sideplate on which the pretensioner is mounted, which sideplate is shown from inside the seat;

FIG. 3 is a view of the FIG. 2 sideplate carrying the pretensioner, and seen from above;

MORE DETAILED DESCRIPTION

Figure 1:
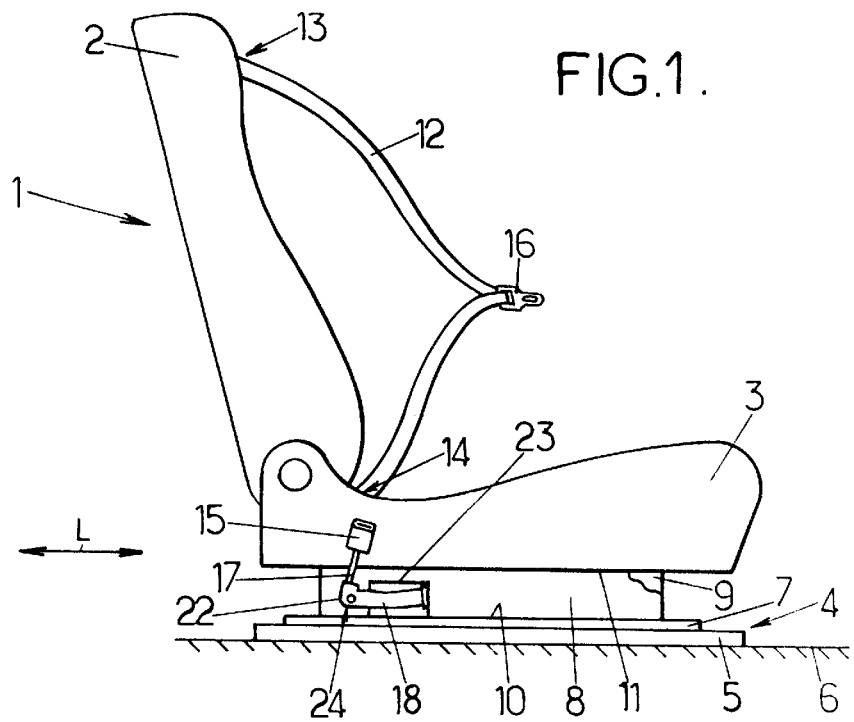
FIG. 1 is an overall view of a seat constituting an embodiment of the invention, including a pretensioner mounted inside a sideplate forming part of an underframe.

FIG. 1 shows a motor vehicle front seat 1 which comprises a seatback 2 and a seat proper 3 that is movable forwards and backwards in a longitudinal direction L by means of two parallel slideways 4, only one of which can be seen in FIG. 1.

Each of the slideways 4 comprises both a fixed metal section bar 5 which is secured to the floor 6 of the vehicle and a moving metal section bar 7 which supports the seat proper 3 via a respective underframe-forming rigid metal sideplate 8 or 9.

Each of the sideplates 8 and 9 extends vertically between a bottom portion 10 which is fixed to the moving section member of the corresponding slideway 4, and a top portion 11 which is mechanically linked to the structure of the seat 3, this top portion either being fixed rigidly to the structure of the seat, or else being connected to the structure of the seat via a lifting mechanism enabling the height of the seat to be adjusted.

In addition, the seat 1 has a seatbelt 12 which may be of the "built-in" type, i.e. it has three anchor points each associated with the seat, namely:

- a top anchor point 13 generally constituted by a belt winder that is integrated in the seatback 2;
- a permanent bottom anchor point 14 secured to the seat proper 3 or to some other mechanical member fixed thereto, on the same side as the sideplate 9; and
- a catch 15 for locking the buckle 16 of the seatbelt, on the same side as the other sideplate 8.

Naturally, the seatbelt 12 need not be of the "built-in" type, in which case anchor points 13 and 14 would be secured to the bodywork of the vehicle.

As shown in FIGS. 1 and 2, the catch 15 is fixed to one end of a relatively stiff metal cable 17 whose other end is fixed to a one-piece pretensioner 18 which extends substantially in the longitudinal direction L between a front end 21 and a rear end 22 which projects from the outside of the sideplate 8 through a window 23 provided in said sideplate.

The pretensioner 18 comprises:

- a support 24 situated towards the rear end of the pretensioner, said support being fixed to the sideplate 8 and preferably being a single casting of light alloy;
- a metal tube or barrel 19 situated towards the front end of the pretensioner and fixed to the support 24; and
- a pyrotechnic device (not shown but well known to the person skilled in the art) which is contained in the support 24 and which is connected to an impact sensor 20 via a connector 20a and an electric cable 20b situated inside the sideplate 8.

The pyrotechnic device is controlled by the impact sensor 20 so that in the event of the vehicle being subjected to a violent impact, the pyrotechnic device launches a projectile into the barrel 19, which projectile is fixed to the end of the cable 17, thereby causing a strong traction force to be exerted suddenly on the cable and thus tightening the seatbelt 12.

At the rear end 22 of the pretensioner, the support 24 includes a guide 24a through which the cable 17 passes, the cable thus having a first free length 25 which extends from the catch 15 to the guide 24a, and a second length 26 which extends from the guide 24a to the pyrotechnic device of the pretensioner.

In addition, at the rear end 22 of the pretensioner, the support 24 is fixed to the outside of the sideplate 8 via a screw 27 which passes through the support 19 and the sideplate 8 and which is engaged in a nut 28 welded to the inside of the sideplate 8.

Figure 4:
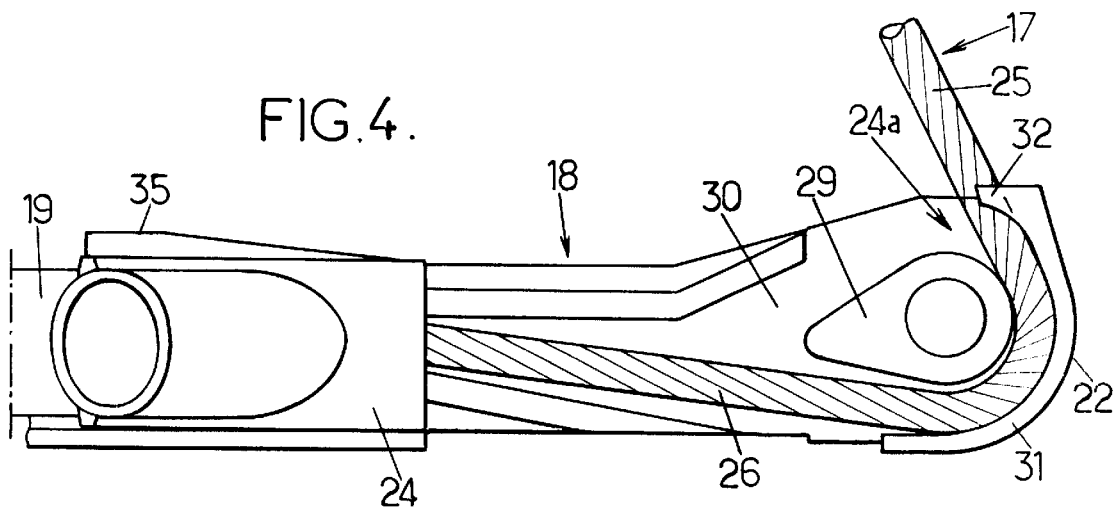
FIG. 4 is a fragmentary side view of the support in which the pretensioner of the FIG. 1 seat is mounted.

More precisely, the screw 27 passes through the central core 29 (see FIG. 4) of the support 24, said core being partially surrounded by the cable 17 and serving to deflect the cable between the first length 25 and the second length 26 thereof.

The central core 29 is secured to a vertical side cheek 30 that also forms part of the support 24, and it is interposed between said cheek 30 and the sideplate 8 so that the cable 17 is held laterally between the cheek 30 and the sideplate 8.

In addition, at the rear end of the support 24, a rim 31 projects at right angles from the cheek 30 and extends as far as the sideplate 8, thereby keeping the cable 17 captive close to the core 29.

Finally, a tab 32 projects from the top of the rim 31 (see FIG. 3), which tab extends forwards parallel to the first sideplate, so that the cable 17 is retained between said tab and the cheek 30 before the support 19 is mounted on the sideplate 8.

The pretensioner 18 can thus be shipped together with the cable 17, and where appropriate the belt catch 15, with this prefabricated unit being ready for assembly, and being subsequently very simple to assemble to the sideplate 8 merely by screw means.

Figure 5:
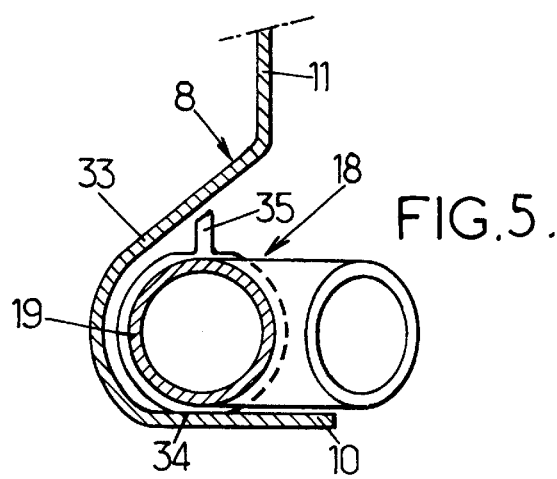
FIG. 5 is a cross-section view of the sideplate shown in FIGS. 2 and 3 and carrying the pretensioner, the section being on line V—V of FIG. 3.

In addition, as can be seen in particular in FIG. 5, the barrel 19 and the front portion of the support 24 are partially surrounded: by a curved side wall 33 forming a part of the sideplate 8; by the bottom portion 10 of the sideplate projecting towards the inside of the seat and forming a horizontal rim; and by the top portion 11 of the sideplate projecting upwards and forming a vertical rim.

The curved wall 33 co-operates with abutment zones 34 and 35 of the support 24 to prevent the support rotating about the screw 27 when the passenger on the seat exerts traction on the seatbelt 12 or when the pretensioner 18 is fired.

Finally, as shown in FIG. 2, the front portion of the curved wall 33 projects towards the inside of the sideplate 8 to form a rim 36 which masks the front of the barrel 19.

We claim:

1. A motor vehicle seat comprising:

a seat proper;

first and second rigid sideplates each extending horizontally in a "longitudinal" direction and vertically between a bottom portion mechanically connected to the floor of the vehicle and a top portion mechanically connected to the seat proper, each of the two sideplates having an inside facing the other of the two sideplates and an opposite outside;

a seatbelt catch fixed to a cable itself connected to a pretensioner adapted to exert traction on the cable when the vehicle is subjected to a violent impact, the pretensioner being fixed to the first sideplate and extending substantially in the longitudinal direction between a front end and a rear end provided with a guide through which the cable passes;

wherein the pretensioner passes through an opening formed in the first sideplate, the rear end of the pretensioner projecting from the outside of the first sideplate while the major portion of the pretensioner is situated on the inside of said sideplate;

wherein the guide through which the cable passes has a rigid central core which is partially surrounded by the cable and which is rigidly fixed on the outside of the first sideplate and wherein the central core of the guide is secured to the pretensioner.

2. A motor vehicle seat according to claim 1, in which the pretensioner is connected to an electrical connector, itself designed to be connected to an impact sensor via a wire connection, said connector being situated on the inside of the first sideplate.

3. A seat according to claim 1, in which the central core of the guide is fixed to the first sideplate by a single screw and nut assembly passing through said central core, the pretensioner having abutment zones situated on the inside of the first sideplate and adapted to co-operate with the first sideplate to prevent any rotation of the pretensioner about the screw and nut assembly.

4. A seat according to claim 1, in which the cable is held captive in the guide of the pretensioner between the first sideplate and a side cheek which is secured to the central core of the guide, said cheek being extended at the rear end of the support by a rim which extends substantially as far as the first sideplate and which keeps the cable close to the central core.

5. A seat according to claim 4, in which said rim has a top portion which is extended forwards by a tab, the cable thus being retained between said tab and said cheek.

6. A seat according to claim 1, in which the first sideplate has a horizontal bottom rim which projects from the inside of the first sideplate and which is mechanically connected to the floor of the vehicle, said rim being extended by a curved side wall which covers the pretensioner and its support, at least in part, and the curved side wall is itself extended by the top portion of the sideplate which is mechanically connected to the seat proper.

7. A seat according to claim 6, in which the curved side wall is extended forwards by a rim which projects substantially at right angles from the inside of the first sideplate, forwardly masking the front end of the pretensioner, at least in part.

* * * * *